United States Patent
Branson et al.

(10) Patent No.: US 9,471,639 B2
(45) Date of Patent: Oct. 18, 2016

(54) MANAGING A GROUPING WINDOW ON AN OPERATOR GRAPH

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 14/031,166

(22) Filed: Sep. 19, 2013

(65) Prior Publication Data

US 2015/0081707 A1 Mar. 19, 2015

(51) Int. Cl.
G06F 17/30 (2006.01)

(52) U.S. Cl.
CPC ..... *G06F 17/30516* (2013.01); *G06F 17/3028* (2013.01); *G06F 17/30286* (2013.01); *G06F 17/30424* (2013.01)

(58) Field of Classification Search
CPC .......... G06F 17/30289; G06F 17/30516; G06F 17/3051; G06F 17/30536; G06F 17/30315; G06F 17/30327; G06F 17/30442; G06F 17/30424; G06F 17/3028; G06F 17/30286
See application file for complete search history.

(56) References Cited

U.S. PATENT DOCUMENTS

| | | | |
|---|---|---|---|
| 5,481,703 A * | 1/1996 | Kato ................. | G06F 17/30595 |
| 6,507,835 B1 * | 1/2003 | Amundsen ........ | G06F 17/30469 |
| 7,015,928 B2 | 3/2006 | MacInnis et al. | |
| 7,536,397 B2 * | 5/2009 | Corston-Oliver ...... | B42D 15/00 |
| 7,613,848 B2 | 11/2009 | Amini et al. | |
| 7,644,110 B2 | 1/2010 | Nishizawa et al. | |
| 7,797,342 B2 | 9/2010 | Banks et al. | |
| 8,024,350 B2 | 9/2011 | Torikai et al. | |
| 8,032,554 B2 * | 10/2011 | Nishizawa ........ | G06F 17/30489 707/781 |
| 8,095,690 B2 | 1/2012 | Kashiyama et al. | |
| 8,381,233 B2 | 2/2013 | Ali et al. | |
| 2004/0236762 A1 * | 11/2004 | Chaudhuri ........ | G06F 17/30463 |
| 2004/0249810 A1 * | 12/2004 | Das .................... | G06F 17/30536 |
| 2007/0226188 A1 | 9/2007 | Johnson et al. | |
| 2007/0294217 A1 * | 12/2007 | Chen ................. | G06F 17/30516 |
| 2008/0170502 A1 | 7/2008 | Benton et al. | |

(Continued)

OTHER PUBLICATIONS

Miran Dylan, "An Analysis of Streamprocessing Languages", Department of Computing, Macquarie University,Sydney—Australia, published May 24, 2009, pp. 1-38.*

(Continued)

*Primary Examiner* — Srirama Channavajjala
(74) *Attorney, Agent, or Firm* — Brian Welle; Feb R. Cabrasawan

(57) ABSTRACT

Embodiments of the disclosure provide a method, system, and computer program product for managing a windowing operation. The method can include determining a sentinel value that defines a start of a grouping window for a stream of tuples and a terminating sentinel value that defines the end of the grouping window based upon an attribute contained in the stream of tuples. The stream of tuples can be monitored for the sentinel value and the terminating sentinel value by a stream operator. The stream operator can initiate a windowing operation that defines the start of the grouping window in response to a presence of the sentinel value and terminate the windowing operation in response to a presence of the terminating sentinel value.

8 Claims, 8 Drawing Sheets

(56) References Cited

U.S. PATENT DOCUMENTS

| | | | |
|---|---|---|---|
| 2009/0018996 A1* | 1/2009 | Hunt | G06Q 30/02 |
| 2009/0077619 A1 | 3/2009 | Boyce | |
| 2009/0320097 A1* | 12/2009 | Jackson | G06F 17/30545 726/3 |
| 2010/0106710 A1* | 4/2010 | Nishizawa | G06F 17/30516 707/714 |
| 2011/0225659 A1 | 9/2011 | Isaacson et al. | |
| 2012/0203808 A1 | 8/2012 | Larimore et al. | |
| 2012/0218268 A1 | 8/2012 | Accola et al. | |
| 2013/0031124 A1 | 1/2013 | Santosuosso et al. | |
| 2013/0091123 A1 | 4/2013 | Chen et al. | |
| 2013/0275364 A1* | 10/2013 | Wang | G06F 17/30592 707/602 |
| 2015/0081708 A1* | 3/2015 | Branson | G06F 17/30516 707/737 |
| 2015/0088887 A1* | 3/2015 | Branson | G06F 17/30598 707/737 |

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

Tucker et al., "Exploiting Punctuation Semantics in Continuous Data Streams", IEEE Transactions on Knowledge and Data Engineering, May/Jun. 2003, pp. 555-568, vol. 15, Issue 3, IEEE Computer Society, © 2003 IEEE. D.O.I. 10.1109/TKDE.2003.1198390.

Tucker et al., "Using Punctuation Schemes to Characterize Strategies for Querying over Data Streams", IEEE Transactions on Knowledge and Data Engineering, Sep. 2007, pp. 1-14, vol. 19, Issue 9, IEEE Computer Society, © 2007 IEEE. D.O.I. 10.1109/TKDE.2007.1052.

* cited by examiner

MANAGING A GROUPING WINDOW ON AN OPERATOR GRAPH

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Various embodiments are directed toward a method for grouping processing of a stream of tuples with each tuple containing one or more attributes. The method can include receiving the stream of tuples to be processed by a plurality of processing elements operating on one or more computer processors. The method can also include determining a sentinel value that defines a start of a grouping window for the stream of tuples and a terminating sentinel value that defines an end of the grouping window based upon the attribute contained in the stream of tuples. The method can also include monitoring the stream of tuples for the sentinel value and the terminating sentinel value. The method can also include initiating a windowing operation that defines the start of the grouping window at the processing element from the one or more processing elements in response to detecting a presence of the sentinel value. The method can also include terminating the windowing operation at the processing element in response to detecting a presence of the terminating sentinel value.

Various embodiments are also directed toward a system and a computer program product for processing a stream of tuples.

BRIEF DESCRIPTION OF THE DRAWINGS

Like reference numbers and designations in the various drawings indicate like elements.

DETAILED DESCRIPTION

Figure 1:
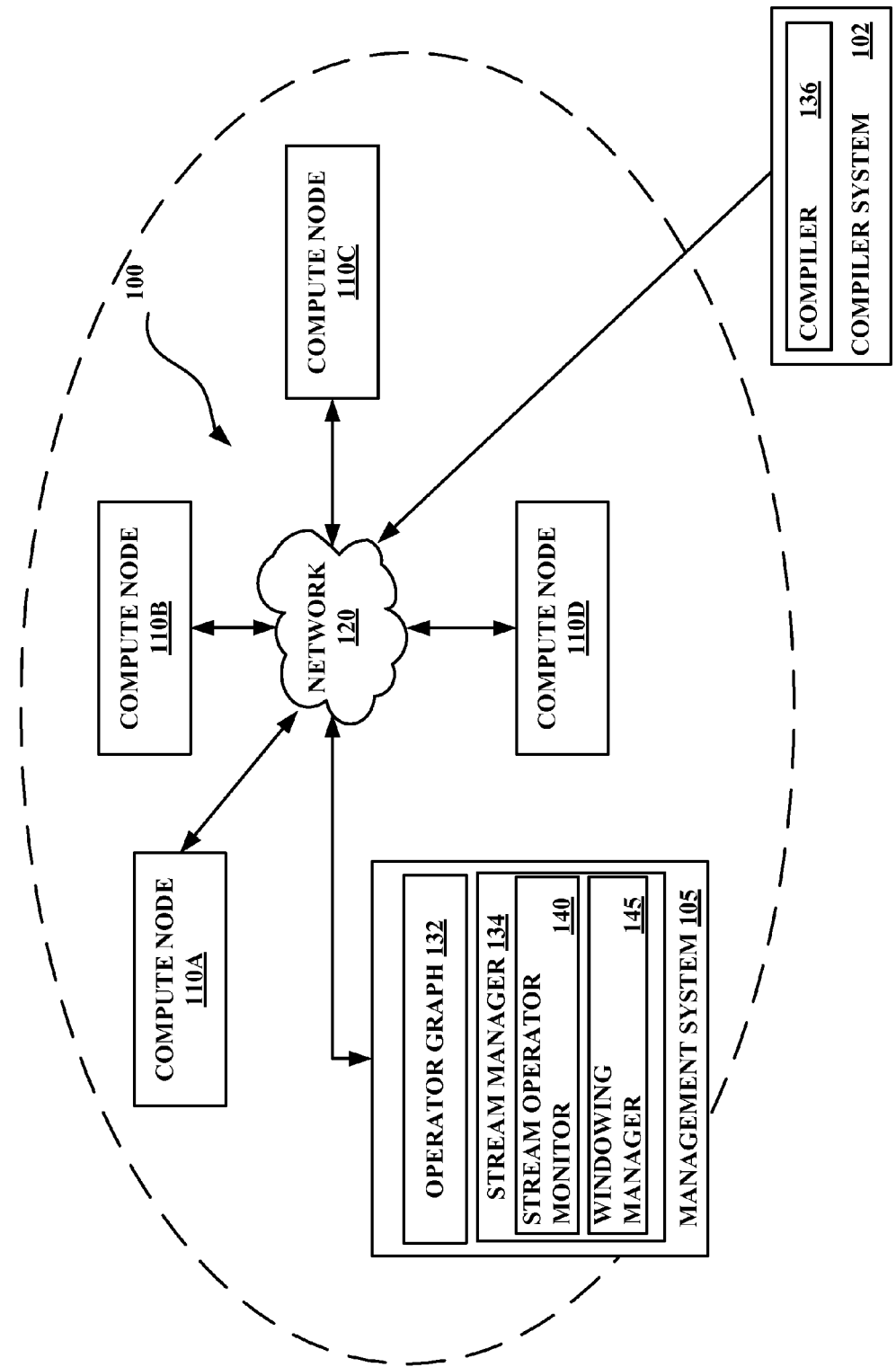
FIG. 1 illustrates a computing infrastructure configured to execute a stream computing application according to various embodiments.

Aspects of the present disclosure are generally directed to determining a sentinel value that defines a start of a grouping window for a stream of tuples and a terminating sentinel value that defines the end of the grouping window based upon an attribute contained in a stream of tuples. The stream of tuples can be monitored for the sentinel value and the terminating sentinel value by a stream operator. The stream operator can initiate a windowing operation that defines the start of the grouping window in response to the presence of the sentinel value and terminate the windowing operation in response to the presence of the terminating sentinel value.

Although not necessarily limited thereto, embodiments of the present disclosure can be appreciated in the context of streaming data and problems relating to indicative elements that process the stream of data. Throughout this disclosure, the term stream operator may be abbreviated "S.O."

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A stream computing application can process tuples within a window in a windowing operation. The windowing operation can be the process of forming the window from a stream of tuples. The window can refer to a group of tuples that are analyzed together. The window can also be referred to as a grouping window since the window groups together tuples from the stream of tuples. Both the terms "grouping window" and "window" can be used interchangeably throughout this disclosure. The group of tuples can be defined through either a fixed amount of time or can be defined by data within some relationship to other data, e.g., a spatial relationship. In streams computing, one type of spatial relationship can be done thru a windowing operation of a given stream operator. The window can be the same size as other windows within a stream of tuples or each window size can be variable.

A beginning, or start, and end of a window in the windowing operation can be defined in a number of ways, e.g., the predetermined size of the window, a period of time, a punctuation marker in the stream, or the attribute values for the tuples in a window. In various embodiments, where the attribute values are used to define the beginning and end of a window, the windowing operation can also be initiated by a sentinel value. A stream operator can monitor the stream of tuples for the sentinel value to determine the size of the window.

A sentinel value can generally be an indication of the beginning of a window while a terminating sentinel value is generally an indication of the end of a window. The sentinel value can be a particular attribute value. A stream operator can apply one or more actions in response to the sentinel value. For example, once the sentinel value is detected, a stream operator can implement an action that implements a windowing operation before performing a processing operation on the window.

A sentinel value can be defined by more than one attribute value. For example, a sentinel value can be defined by a particular tuple that includes an attribute value of "Pine" for the attribute of "Tree" and an attribute value of "Mountain" for the attribute of "Location".

In various embodiments, a sentinel value can be defined by more than one attribute value in different tuples. For example, the sentinel value can be an initiation condition when the attribute value for the attribute "Tree" is "Juniper", then "Pine". A reading of a first tuple with the attribute value of "Juniper" and a second tuple with the attribute value of "Pine" can be the sentinel value.

A terminating sentinel value can be used to trigger the termination of the grouping window and can be an attribute read from the stream of tuples. The terminating sentinel value can be the same or different than the sentinel value. If the sentinel value is the same as the terminating sentinel value, then the terminating sentinel value can be based on a function of the number of times the sentinel value appears. For example, if the sentinel value is a particular attribute value, then the terminating sentinel value can be 12 instances of the sentinel value. Embodiments of the disclosure can be directed toward a method to populate and initiate a windowing operation using sentinel values contained in the tuples of a stream.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 3:
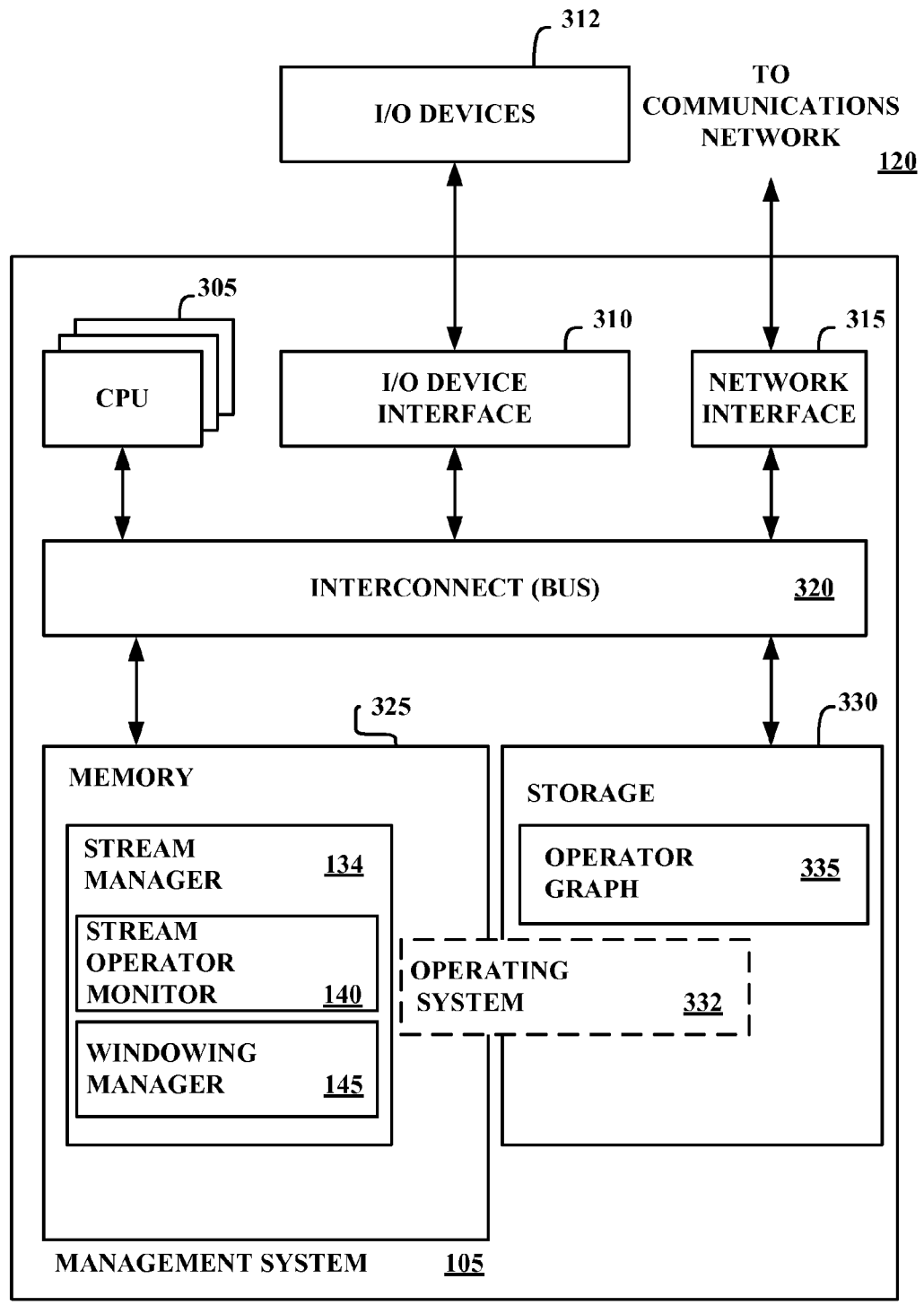
FIG. 3 illustrates a more detailed view of the management system of FIG. 1 according to various embodiments.

The management system 105 can control the management of the compute nodes 110A-110D (discussed further on FIG. 3). The management system 105 can have an operator graph 132 with one or more stream operators and a stream manager 134 to control the management of the stream of tuples in the operator graph 132. The stream manager 134 can have components such as a stream operator monitor 140 and a windowing manager 145. The stream operator monitor 140 can monitor an attribute of a particular tuple from the stream of tuples and communicate the attribute to the stream manager 134, according to various embodiments. The windowing manager 145 can manage determination of a sentinel value and a terminating sentinel value.

In various embodiments, a stream operator can communicate with the stream operator monitor 140 that a sentinel value has been identified. The stream operator monitor 140 can monitor the stream of tuples at one or more of the stream operators. Various embodiments of the disclosure can be directed toward specific types of stream operators, e.g., aggregate stream operators or counting stream operators. The stream operator monitor 140 can further communicate to the windowing manager 145 and request that the windowing manager 145 allow the stream operator to initiate a windowing operation.

In various embodiments, the stream operator can access the sentinel value and terminating sentinel value from the windowing manager 145. It can be possible for the stream operator to be compiled with the sentinel value and terminating sentinel value. The detection of the sentinel value by the stream operator can result in the initiation of a window and the detection of the terminating sentinel value by the stream operator can result in the termination of the window. The detecting stream operator can wait on the windowing manager 145 for permission to initiate or terminate the window, or can immediately initiate or terminate the window.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
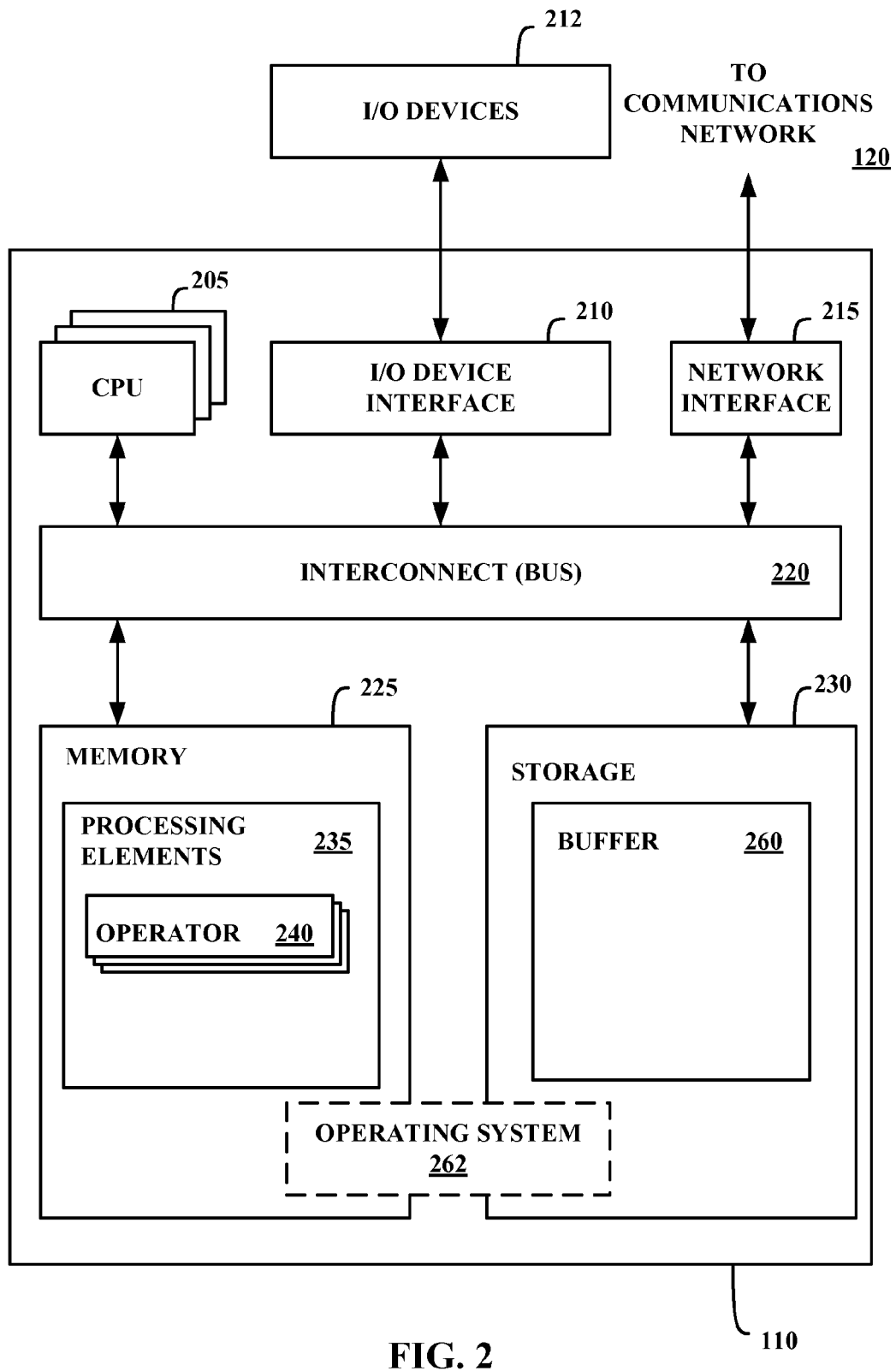
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that manage the windowing operation of a stream operator. In various embodiments, the stream manager 134 may have a stream operator monitor 140, and a windowing manager 145, discussed herein.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
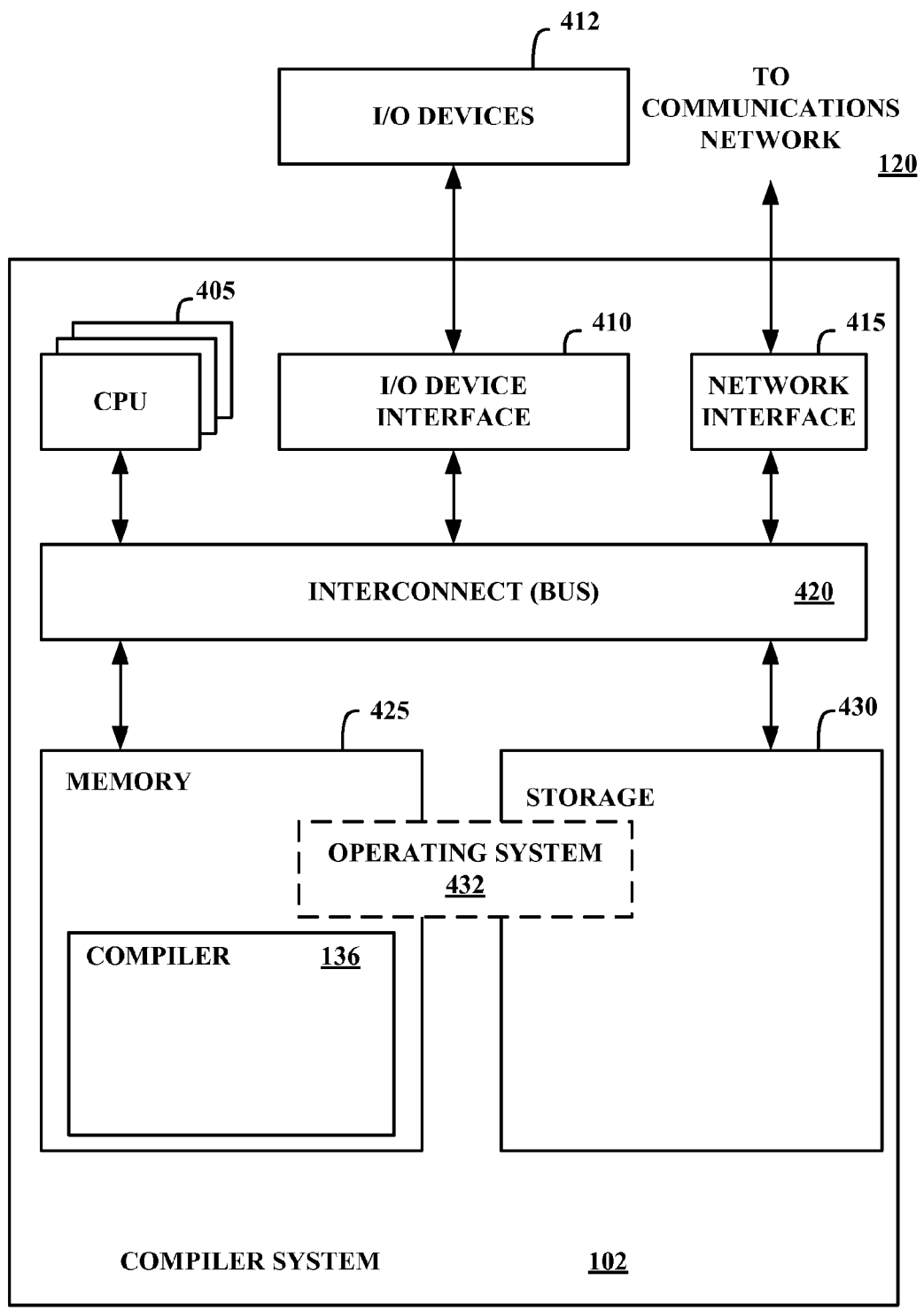
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

In various embodiments, the compiler 136 can include the windowing operation on a particular stream operator on the operator graph 335 during compile time by writing the windowing operation onto a particular stream operator. In various embodiments, the windowing operation may be included as a default and activated from the stream manager 134. The windowing operation may also be included as an optional feature for a particular stream operator and may be activated by the application.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
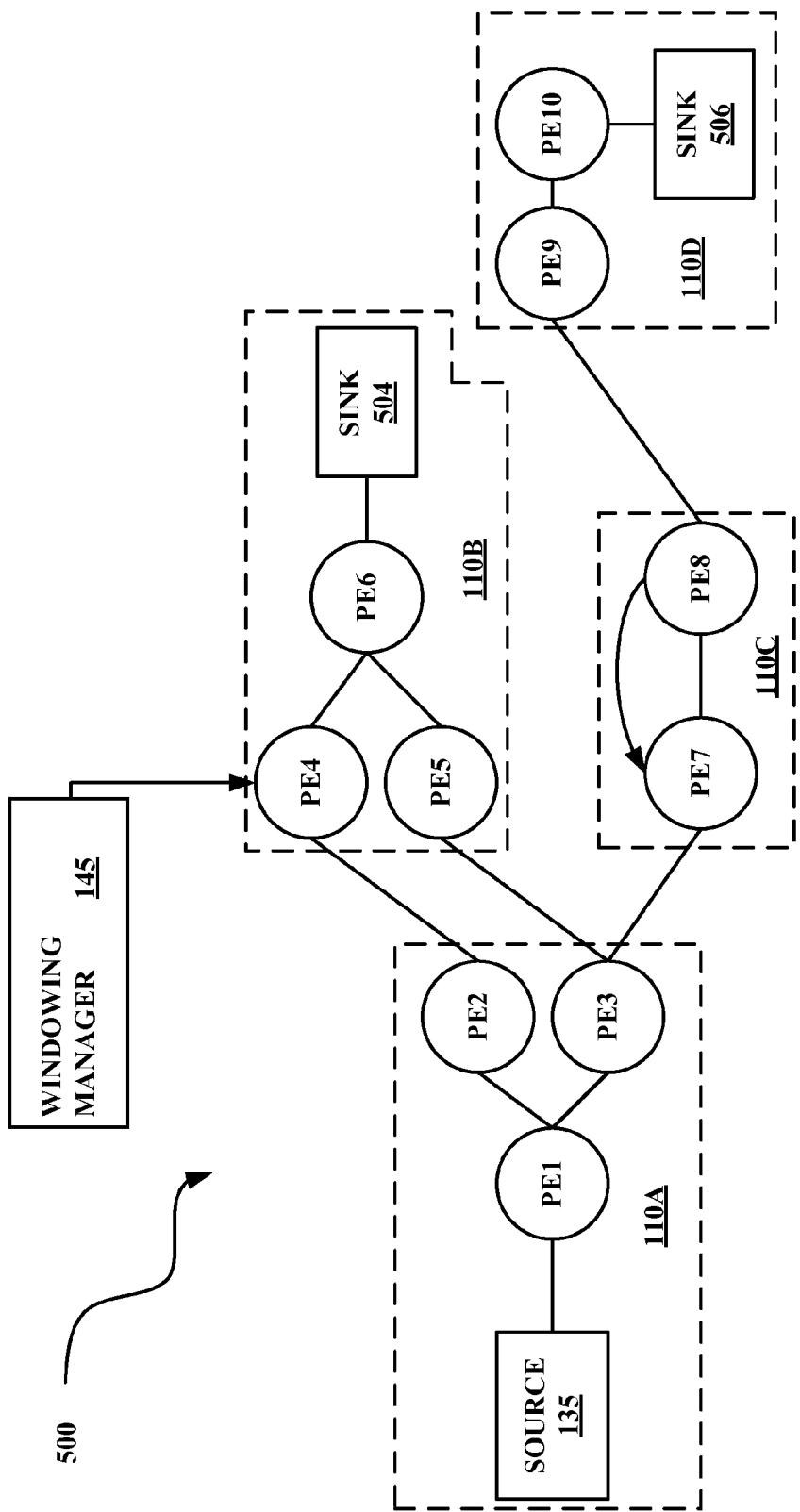
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

Each processing element may have a windowing manager 145. The processing element may further transmit or direct the stream operator to conduct a windowing operation within the processing element. The operator graph 132 can encompass one or more processing elements, e.g., PE2 and PE4 from FIG. 5, which may lie on more than one compute node, e.g., 110A and 110B.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
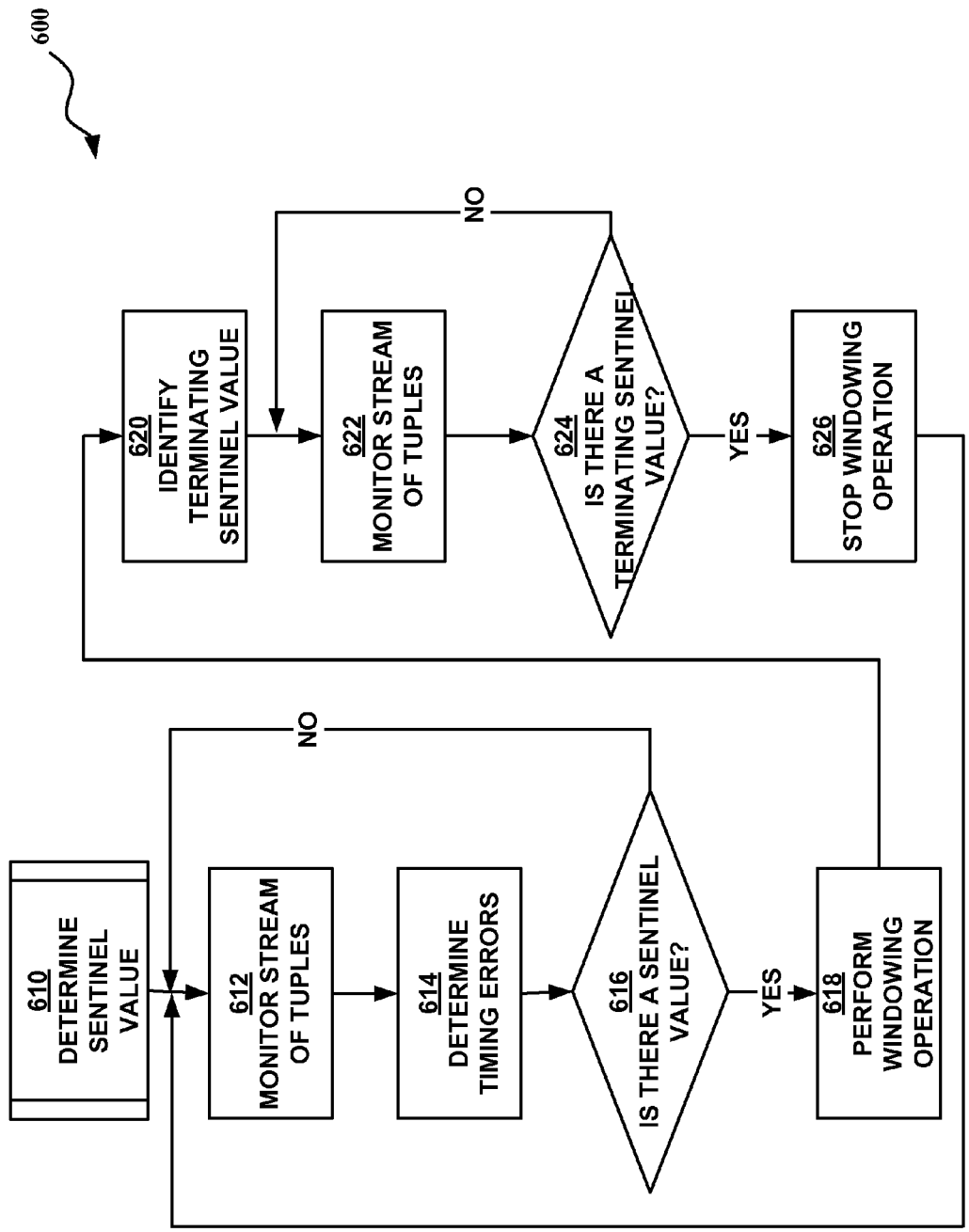
FIG. 6 illustrates a flowchart of a method for implementing a windowing operation based on a sentinel value, according to various embodiments.

FIG. 6 illustrates a flowchart of a method 600 for implementing a windowing operation based on a sentinel value, according to various embodiments. Generally, the method 600 can involve finding a sentinel value from the stream of tuples, and using the sentinel value to trigger a windowing operation. The method can also involve finding a terminating sentinel value from the stream of tuples, and using the terminating sentinel value to trigger a stop of the windowing operation. The size of a window can be determined by the number of tuples between the sentinel value and the terminal sentinel value. The method 600 can begin at operation 610. In operation 610, a windowing manager, e.g. the windowing manager 145 from FIG. 1, can determine the sentinel value. In various embodiments, the sentinel value can be determined based on application preferences. The application preferences can be further defined by user input. For example, the sentinel value for a forestry survey can be a tree that indicates a particular ecosystem which could be determined by the application. The application preferences can also be determined by a subroutine. The details of determining a sentinel value can be discussed further herein. After the sentinel value is determined in operation 610, then the method 600 can continue to operation 612.

In operation 612, stream operator monitor 140 can monitor the stream of tuples that are received by a stream operator in the operator graph. The stream operator monitor 140 can have programmable code inserted into each stream operator through the stream manager 134. The stream operator with the programmable code can send the contents of every attribute to the stream manager 134. In various embodiments, the stream operator can receive programmable code that identifies a sentinel value that will trigger a windowing operation. Once received, the stream operator can monitor each tuple from the stream of tuples during the stream operator's assigned processing function. The stream operator can read each attribute and once the sentinel value is located, then the stream operator can notify the stream operator monitor 140 on the stream manager 134. After operation 612, the method 600 can continue to operation 614.

In operation 614, the stream operator monitor, e.g., stream operator monitor 140 from FIG. 1, can determine whether there is a timing error. Timing errors can occur when a stream operator receives a first tuple after a second tuple. For example, a first tuple that was sent from a stream operator may receive a time stamp of 1200 while a second tuple that was sent from the stream operator may receive a time stamp of 1202. The first tuple may be received by another stream operator at 1220 while the second tuple may be received by another stream operator at 1215, due to network or processing latency between the stream operators that causes the first tuple to be delayed.

The stream operator monitor 134 can monitor the time stamp for the stream of tuples to determine whether a timing error exists. If the timing error is detected, then the stream manager 134 can determine whether to discard a tuple to correct the timing error based on the application parameters. In various embodiments, the application parameters can have a tolerance level for late data that can be adjusted. In various embodiments, the tolerance level can be a buffer to hold a certain number of tuples in order to rearrange the receipt of the tuples. The tolerance level can also refer to a time-based tolerance level where the timing error can be corrected to values within the tolerance level.

Continuing the example previously mentioned, if the tolerance level is 5 minutes, then every tuple received in the last 5 minutes can be retained in a buffer. If the second tuple used in the previous example is received at 1215, and the first tuple is received at 1220, then the first tuple is within the 5 minute tolerance level. However, if the first tuple is received at 1221, then the first tuple would not be within the 5 minute tolerance level and would be considered outside of the tolerance level. Assuming that the first tuple is within the tolerance level, the stream manager 134 can take the first tuple and adjust the order of the stream to ensure that the first tuple is ordered before the second tuple. After timing errors are corrected, the method 600 can continue to operation 616.

In operation 616, the stream operator monitor 140 can determine whether there is a sentinel value identified. A sentinel value can be an attribute value or range of attribute values of a tuple that cause the windowing manager to start the windowing operation. In various embodiments, the sentinel value can be a combination of two different attributes for a tuple. If there is not a sentinel value identified by the stream operator monitor 140, then the method 600 can continue to operation 612 where further monitoring can continue until a sentinel value is identified. In various embodiments, if a sentinel value is not detected within a period of time, e.g., 50 minutes, then the method 600 may timeout or stop. If there is a sentinel value identified, then the method 600 can continue to operation 618.

In operation 618, the windowing manager 145 can perform a windowing operation. As discussed herein, the windowing operation can define a start and a stop of a group of tuples. The group of tuples can have the same calculations performed within the group. For example, if a stream operator performs an averaging calculation, then the stream operator can use the window of the stream of tuples to determine when the averaging starts and when the averaging stops in stream of tuples.

In various embodiments, the sentinel value can be included in the determination of a window. For example, if the windowing operation triggers on the attribute of "7", then the presence of "7" as read by the stream operator monitor 140 can trigger the windowing operation. The tuple with the attribute value of "7" can either begin the windowing operation once "7" is received or any number of tuples after. If the "7" is received, then the windowing manager 145 can start the windowing operation after four tuples from the sentinel value to create a buffer. Alternatively, the windowing manager 145 can start the windowing operation that includes the tuple with the sentinel value. After the windowing operation is performed, the method 600 can continue to operation 620.

In operation 620, the terminal sentinel value is identified by the windowing manager 145. The terminal sentinel value, discussed herein, can be similar in concept to the sentinel value. The terminal sentinel value can be derived from operation 610. For example, if the sentinel value is a name of a tree to trigger the windowing operation, then the terminating sentinel value can be based off of a number of instances the name of the tree shows up within the window.

The terminal sentinel value can be an attribute value or range of attribute values that causes the windowing manager 145 to cease the windowing operation. For example, if the terminal sentinel value is a range of attribute values, and the attribute is age and the terminal value is a range between 40 and 50, then when a stream operator reads an attribute value of 41 the windowing operation stops. A range of sentinel values can work in a similar fashion. In one example, the sentinel values can be a range, e.g., an age range, to capture a certain marketing demographic and terminated by the presence of another range. After the terminal sentinel value is identified in operation 620, the method 600 can continue to operation 622.

In operation 622, the stream of tuples can be monitored for the terminating sentinel value by the stream operator using the code provided by the stream operator monitor 140. In various embodiments, operation 622 can occur simultaneously with operation 612. Multiple sentinel values can apply to a stream of tuples which can produce multiple windowing operations and use multiple terminating sentinel values to terminate the windowing operations. In various embodiments, operation 622 can be the same as operation 612. A stream operator can monitor for both the terminating sentinel value and a sentinel value simultaneously. After operation 622, the method 600 can continue to operation 624.

In operation 624, the windowing manager 145 can determine the presence of a terminating sentinel value. If a terminating sentinel value is not present, then the method 600 can continue to operation 622. If a terminating sentinel value is present, then the method 600 can continue to operation 626.

In operation 626, the windowing manager 145 can stop the windowing operation. A windowing operation can be stopped by a stream operator reading the terminating sentinel value. Once read, the stream operator can transmit a signal that a terminating sentinel value was found and broadcast the signal to the windowing manager 145. The windowing manager 145 can decide to stop the windowing operation and transmit a stop signal to the stream operator that discovered the terminating sentinel value. The stream operator can then stop the windowing operation. In various embodiments, the windowing operation can be stopped by the stream operator once the terminating sentinel value is read without going through the windowing manager 145. The stream operator can notify the windowing manager 145 that the windowing operation is stopped for a particular window.

Figure 7:
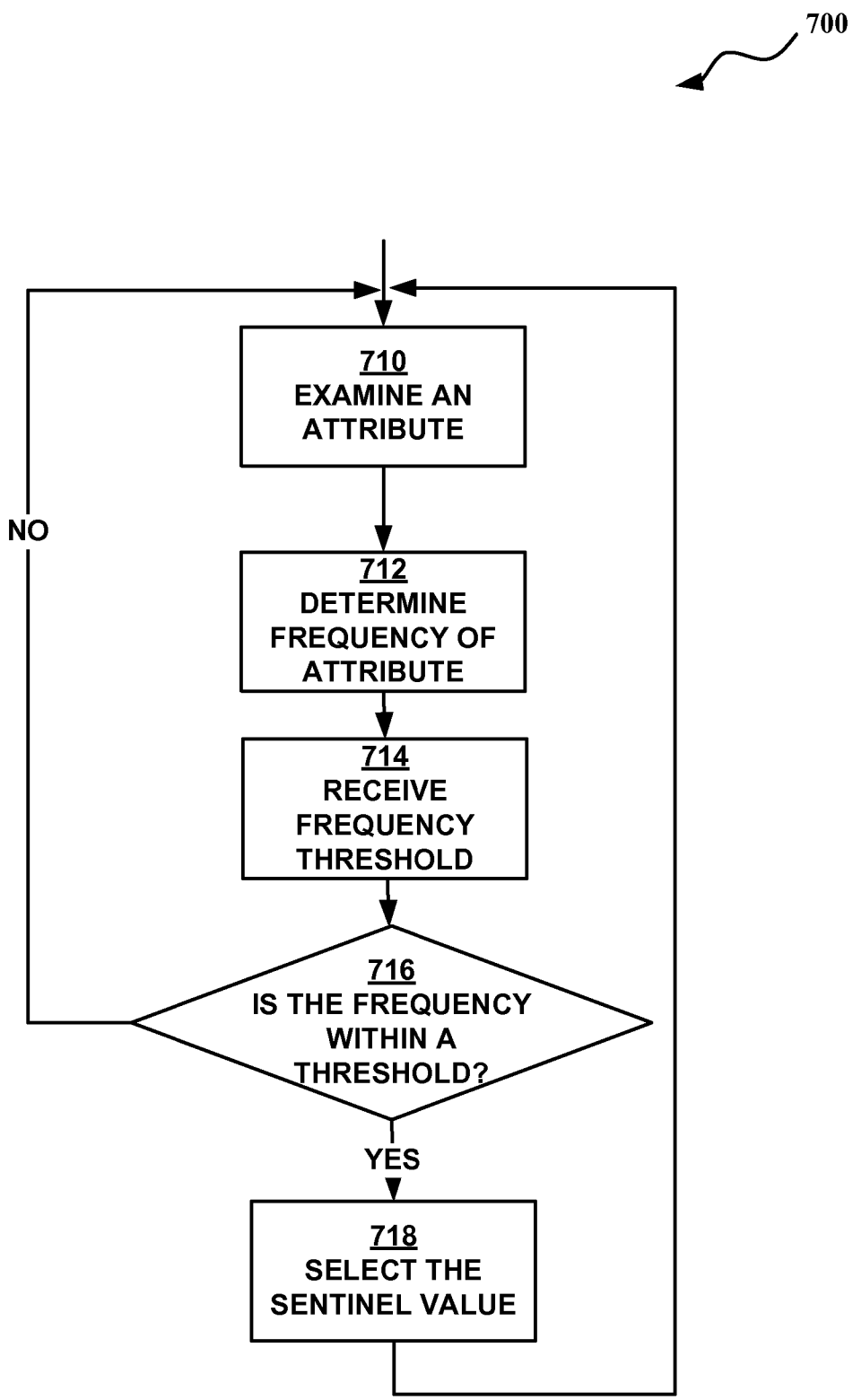
FIG. 7 illustrates a flowchart of a method of determining a sentinel value, according to various embodiments.

FIG. 7 illustrates a flowchart of a method 700 of determining a sentinel value, according to various embodiments. The method 700 can correspond to operation 610 from FIG. 6. The method 700 can indicate one particular example of an embodiment and other examples of determining a sentinel value are contemplated. The method 700 can begin at operation 710. In operation 710, the attributes of a tuple are examined by the stream operator as they are received by the stream operator. Operation 710 can be similar in concept to operation 612 in FIG. 6. After the attributes are examined by the stream operators, the method 700 can continue to operation 712.

In operation 712, the frequency of the attribute can be determined by the stream manager 134 working in conjunction with the stream operator. As the attributes are examined in operation 710, the stream operator can be recording counts of the attributes that are read. This may occur using a counting stream operator on a parallel path. In various embodiments, the attribute values can be counted before they are processed and the data transmitted to the stream manager 134. The counts can be further used to determine the frequency. After the frequency of an attribute value is determined, the method 700 can continue to operation 714.

In operation 714, the stream operator can receive a frequency threshold value. The frequency threshold value can be a minimum or a maximum frequency. For example, the frequency threshold value can be any time more than 15 instances of the attribute value "juniper" appears out of 30 attributes. Thus, anytime that the frequency is higher than 15 instances, the value can meet the threshold. A minimum can be established in order for the application to select a sentinel value that appears more frequently. A sentinel value that appears more frequently could potentially have shorter, but more frequent windowing operations.

In other instances, a maximum frequency threshold value can be set. For example, an application can set the frequency threshold value so that the frequency is under 15 instances of the attribute value "juniper" out of 30 instances. A maximum frequency threshold value can be set when an application does not desire too many instances of a particular sentinel value. A sentinel value that appears infrequently can have longer windows because the number of attributes between the sentinel values is greater than if the sentinel value appeared frequently.

In operation 716, the streams manager 134 can determine if the frequency of the attribute value is within a threshold. For example, if, in operation 712, the frequency of the attribute value "juniper" occurs in 16 instances out of 30 instances, then the threshold value can be met if the frequency threshold value is at least 15 instances out of 30 instances for the attribute value "juniper". If the frequency of the attribute value is not within the threshold value, then the method 700 can continue to operation 710.

A sentinel value may not be detected within a period of time in what can be referred to as a detection timeout. In a detection timeout, the stream manager 134 can define a particular time period necessary to detect a sentinel value. The absence of a detection value can trigger the detection timeout. Possible responses to the detection timeout can include modifying the sentinel value to increase a frequency of detection. The sentinel value can be modified by adjusting the frequency threshold. The sentinel value can also be modified by defining the sentinel value at the application level. The sentinel value can be defined to include a certain term that appears more frequently. If the frequency of the attribute value is within the threshold value, then the method 700 can continue to operation 718.

In operation 718, the stream manager 134 can select the attribute value as the sentinel value. In various embodiments, the sentinel value can also be determined by application preferences.

Figure 8:
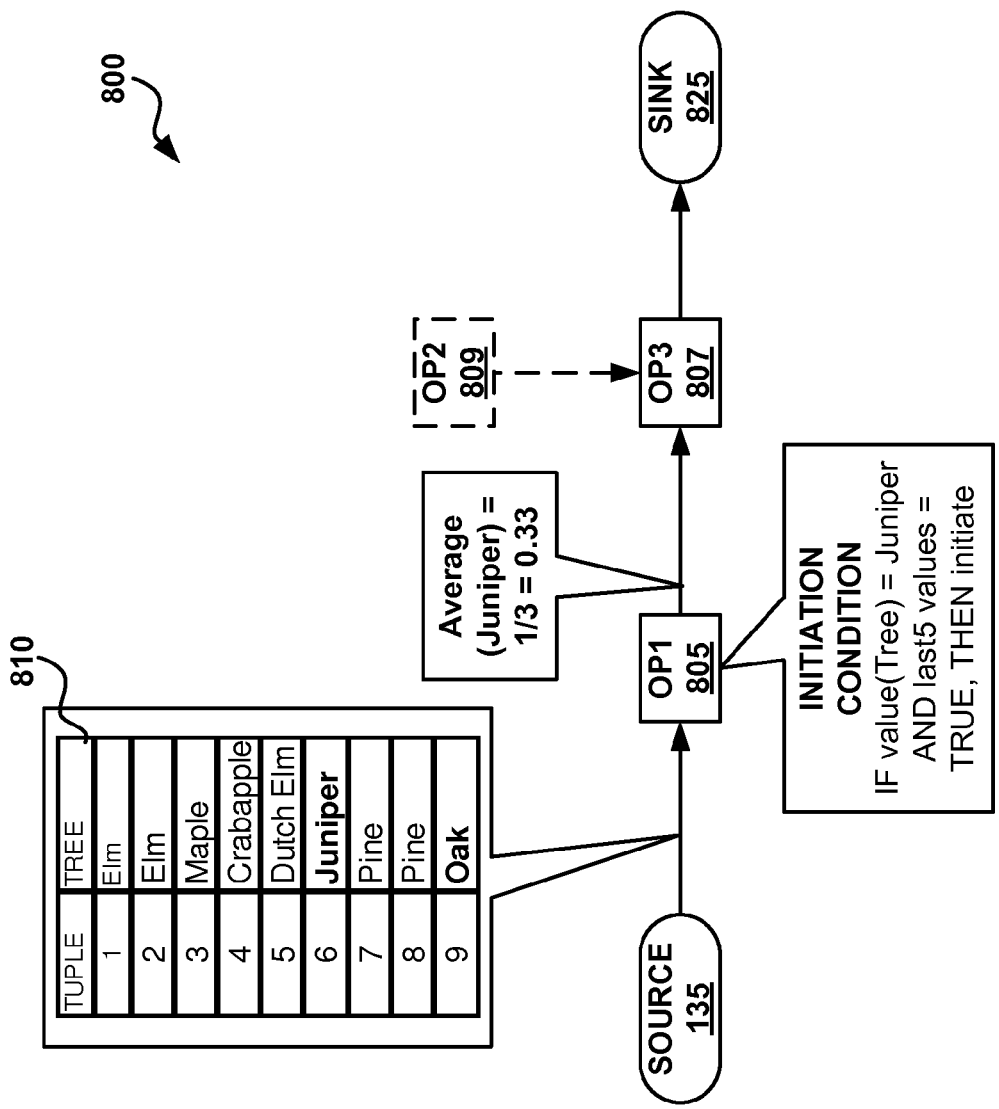
FIG. 8 illustrates a block diagram of an operator graph that implements a windowing operation in response to a sentinel value, according to various embodiments.

FIG. 8 illustrates a block diagram of an operator graph 800 that implements a windowing operation in response to a sentinel value, according to various embodiments. The operator graph 800 can be used in the context of processing data from a forest survey. The forest survey example will be used through the discussion for operator graph 800 to illustrate the concepts discussed herein.

The operator graph 800 can have a stream operator 805. The stream operator 805 can be a stream operator that produces an average for a certain type of tree, e.g., a Juniper tree, in a grouping window. The stream operator 805 can receive a stream of tuples from a source 135. The stream operator 805 can perform a processing operation, e.g., performing an average for Juniper trees. A windowing operation can occur at stream operator 805 in order to isolate particular attribute values. The stream operator 805 can send a count for the attributes within the window to an aggregate stream operator 807. The aggregate stream operator 807 can receive counts from multiple counting stream operators, e.g., 805 and 809, and add them together. The resulting count of attributes can be sent to a sink 825.

The stream operator 805 can also implement an action, or specifically, an action to initiate the windowing operation. The action can cause the stream operator 805 to react to a particular sentinel value or an initiation condition. As mentioned herein, the sentinel value is a value that initiates a windowing operation. For the purposes of illustration, the initiatation condition can be based on a single sentinel value and can be used to initiate a grouping window. In this example, the initiation condition provides that if the sentinel value of "Juniper" is found and the 5 values of the tree attribute preceding the value "Juniper" are not blank, then the windowing operation can be initiated. In various embodiments, whether the 5 values preceding the "Juniper" value are not blank can be determined by maintaining a buffer within the stream operator 805. For example, stream operator 805 can maintain a history of the last 5 values in a buffer as to whether the last 5 attribute values are blank.

The tuples received for the tree attribute are listed in table 810. Table 810 lists the tuples in the order that they are received and do not necessarily indicate a memory on the part of the operator graph 800. The table 810 shows only the attribute for "tree" but more attributes can be received by the stream operator 805. The tree attribute can have attribute values, e.g., elm, maple, juniper, pine, etc. As an illustration, the 5th tuple received by the stream operator 805 can have the attribute value of "dutch elm".

As the stream of tuples are received, the stream operator 805 monitors each attribute of the tuple for the sentinel value. If the sentinel value is "juniper", then the sentinel value will not be detected until the sixth tuple. Once the sentinel value is detected by the stream operator 805, the stream operator 805 can communicate the detection to the windowing manager 145. The windowing manager 145 can instruct the stream operator 805 to initiate the windowing operation. As an example, the stream operator 805 can be configured to count the values of the attribute value "pine". In the windowing operation, the stream operator 805 can count the attribute value "pine" two times in the window that began with the sentinel value juniper. There can be various reasons for using the sentinel value "juniper" to initiate a window that counts the number of instances of "pine". For example, a forestry researcher can observe that the presence of juniper trees is indicative of a particular ecosystem.

In various embodiments, the stream operator 805 can divert a portion of the stream of tuples, i.e., the grouping window, to an alternate path. Although not illustrated, the windowing operation can allow for the separation of the grouping window from the stream of tuples and the regular processing path. The alternate path can take the tuples in the grouping window and perform an alternate processing compared to processing performed by stream operator 805, and stream operator 807.

The windowing operation can occur until the stream operator 805 receives a terminating sentinel value. For example, the presence of an oak tree can indicate another type of ecosystem and the application can assign "oak" as a terminating sentinel value. Once the presence of the terminating sentinel value is detected, then the window in the windowing operation is closed. In various embodiments, the count can be finalized once the window is closed. The stream operator 805 can perform an averaging operation for Juniper within the grouping window, which contains three values, and transmit the average of 0.33 to the stream operator 807. The stream operator 807 can perform more averaging of multiple windows from stream operators such as stream operator 809 and can transmit an aggregate value to the sink 825.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method for grouping processing of a stream of tuples, each tuple containing one or more attributes, comprising:
receiving the stream of tuples that are to be processed by a plurality of processing elements operating on one or more computer processors;
determining a sentinel value that defines a start of a grouping window for the stream of tuples and a terminating sentinel value that defines an end of the grouping window, wherein both the sentinel value and the terminating sentinel value are based upon attributes from the one or more attributes contained in the stream of tuples;
monitoring tuples within the stream of tuples for a tuple with the sentinel value;
detecting the tuple with the sentinel value by monitoring of tuples for the tuple with the sentinel value;
initiating the grouping window in response to detecting the tuple with the sentinel value, wherein tuples that are subsequent to the tuple with the sentinel value within the grouping window undergo a windowing operation;
monitoring tuples within the stream of tuples that are subsequent to the tuple with the sentinel value for a tuple with the terminating sentinel value;
detecting the tuple with the terminating sentinel value by monitoring of tuples for the tuple with the terminating sentinel value; and
terminating the grouping window in response to detecting the tuple with the terminating sentinel value, wherein tuples of the stream of tuples that are subsequent to the tuple with the terminating sentinel value do not undergo the windowing operation.

2. The method of claim 1, wherein the monitoring the stream of tuples includes:
determining a presence of a timing error between a plurality of tuples from the stream of tuples; and
discarding a tuple from the plurality of tuples in response to the presence of the timing error and the timing error being outside of a tolerance level.

3. The method of claim 1, the determining a sentinel value further comprising:
examining an attribute from each tuple from the stream of tuples;
determining a frequency of the attribute in the stream of tuples;
determining whether the frequency of the attribute is outside of a frequency threshold; and
selecting the attribute as the sentinel value in response to determining that the frequency of the attribute is outside of the frequency threshold.

4. The method of claim 1, wherein initiating a grouping window operation includes:
determining whether a timeout condition is met; and
modifying the sentinel value in response to determining that the timeout condition is met.

5. The method of claim 1, wherein the determining of the sentinel value includes:
determining the sentinel value from a plurality of attributes within the stream of tuples, wherein a first one of the plurality of attributes is in a first tuple in the stream of tuples and a second one of the plurality of attributes is in a second tuple in the stream of tuples.

6. The method of claim 1, wherein the determining of the sentinel value includes determining the sentinel value from a plurality of attributes within the stream of tuples, wherein a first one and a second one of the plurality of attributes is in a first tuple in the stream of tuples.

7. The method of claim 1, wherein the determining of the presence of the sentinel value includes:
- determining the presence of the sentinel value from a first tuple in the stream of tuples; and
- including the first tuple in the grouping window.

8. The method of claim 1, wherein the plurality of processing elements operating on one or more computer processors define an operator graph having a first path for processing the stream of tuples and the windowing operation includes processing tuples within the grouping window through an alternate path.

* * * * *